(12) United States Patent
Loree et al.

(10) Patent No.: US 8,689,876 B2
(45) Date of Patent: Apr. 8, 2014

(54) LIQUIFIED PETROLEUM GAS FRACTURING SYSTEM

(71) Applicant: GASFRAC Energy Services Inc., Calgary (CA)

(72) Inventors: Dwight N. Loree, Black Creek (CA); Shaun T. Mesher, Calgary (CA)

(73) Assignee: GASFRAC Energy Services Inc., Calgary (CA)

( * ) Notice: Subject to any disclaimer, the term of this patent is extended or adjusted under 35 U.S.C. 154(b) by 0 days.

(21) Appl. No.: 13/772,265

(22) Filed: Feb. 20, 2013

(65) Prior Publication Data

US 2013/0161016 A1   Jun. 27, 2013

Related U.S. Application Data

(62) Division of application No. 11/681,737, filed on Mar. 2, 2007, now Pat. No. 8,408,289.

(30) Foreign Application Priority Data

Mar. 3, 2006   (CA) ...................................... 2538936

(51) Int. Cl.
    *E21B 43/26*    (2006.01)

(52) U.S. Cl.
    USPC ....................................... 166/308.2; 166/90.1

(58) Field of Classification Search
    None
    See application file for complete search history.

(56) References Cited

U.S. PATENT DOCUMENTS

| 3,100,528 | A | * | 8/1963 | Plummer et al. | 166/303 |
| 3,368,627 | A | * | 2/1968 | Hurst et al. | 166/307 |
| 3,842,910 | A | * | 10/1974 | Zingg et al. | 166/308.1 |
| 5,990,052 | A | | 11/1999 | Harris | |
| 6,007,227 | A | * | 12/1999 | Carlson | 700/67 |
| 2005/0006089 | A1 | * | 1/2005 | Justus et al. | 166/250.01 |
| 2006/0065400 | A1 | * | 3/2006 | Smith | 166/308.1 |

* cited by examiner

*Primary Examiner* — Angela M DiTrani
(74) *Attorney, Agent, or Firm* — Christensen O'Connor Johnson Kindness PLLC

(57) ABSTRACT

A fracturing system for a well, in which a stream of LPG, a mixture of propane and butane, is injected into the well at frac pressure. Proppant is supplied into the LPG stream, and carried by the LPG mix into the formation. Inert gas such as nitrogen is used for purging system components of LPG, and to help protect against risk of explosion. Nitrogen may also be added to the LPG mix during a frac of shale gas or coal gas formations.

33 Claims, 8 Drawing Sheets

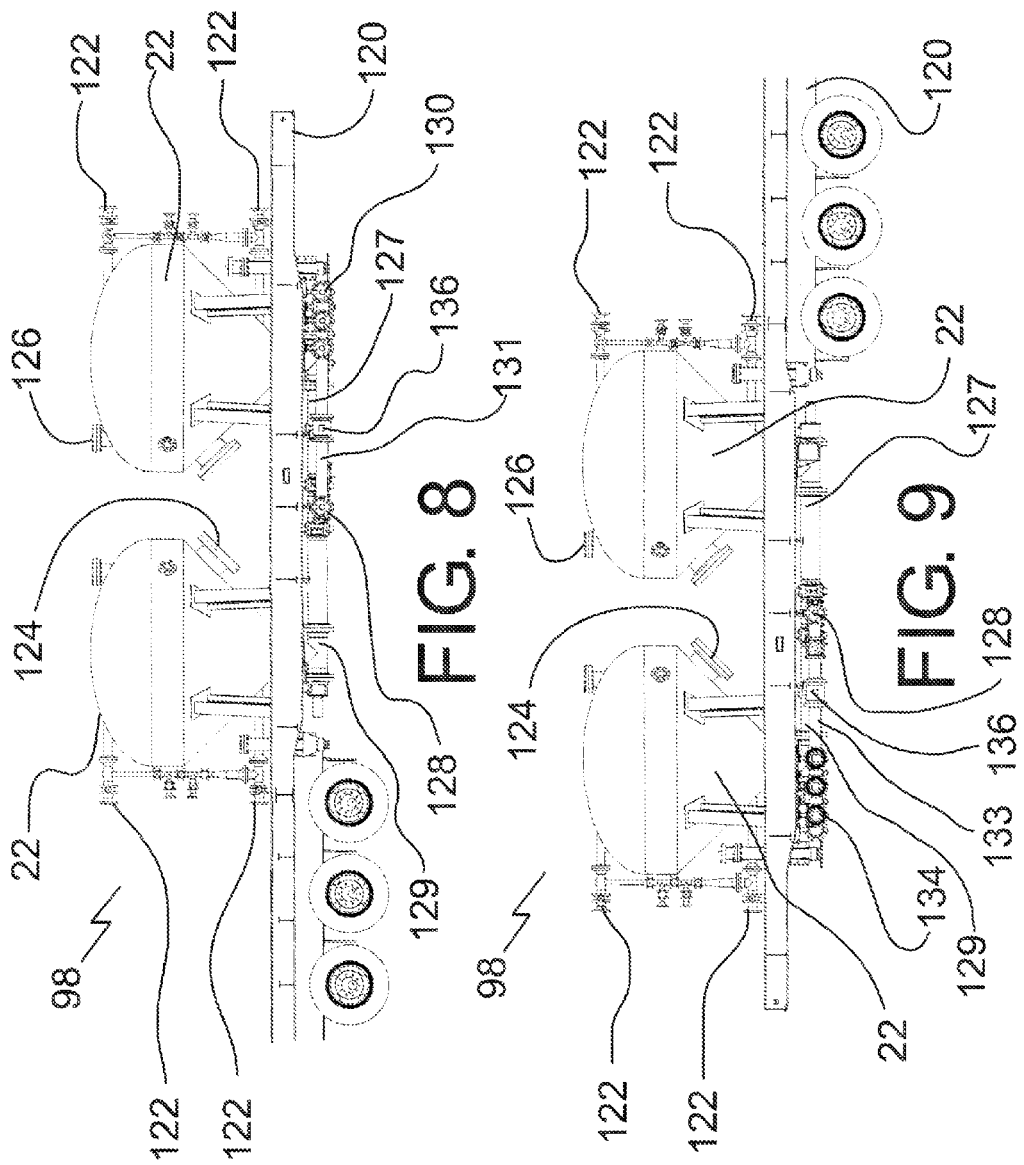

US 8,689,876 B2

LIQUIFIED PETROLEUM GAS FRACTURING SYSTEM

CROSS-REFERENCE TO RELATED APPLICATIONS

This application is a divisional of U.S. patent application Ser. No. 11/681,737, filed Mar. 2, 2007, now U.S. Pat. No. 8,408,289, and claims the benefit under 35 U.S.C. §119(a) of Canadian Patent Application No. 2,538,936, filed Mar. 3, 2006.

BACKGROUND

In the conventional fracturing of wells, producing formations, new wells or low producing wells that have been taken out of production, a formation can be fractured to attempt to achieve higher production rates. Proppant and fracturing fluid are mixed in a blender and then pumped into a well that penetrates an oil or gas bearing formation. High pressure is applied to the well, the formation fractures and proppant carried by the fracturing fluid flows into the fractures. The proppant in the fractures holds the fractures open after pressure is relaxed and production is resumed. Various fluids have been disclosed for use as the fracturing fluid, including various mixtures of hydrocarbons, nitrogen and carbon dioxide.

Care must be taken over the choice of fracturing fluid. The fracturing fluid must have a sufficient viscosity to carry the proppant into the fractures, should minimize formation damage and must be safe to use. A fracturing fluid that remains in the formation after fracturing is not desirable since it may block pores and reduce well production. For this reason, carbon dioxide has been used as a fracturing fluid because, when the fracturing pressure is reduced, the carbon dioxide gasifies and is easily removed from the well.

Lower order alkanes such as propane have also been proposed as fracturing fluids. Thus, U.S. Pat. No. 3,368,627 describes a fracturing method that uses a combination of a liquefied C2-C6 hydrocarbon and carbon dioxide mix as the fracturing fluid. As a lower order alkane, propane and butane are inherently non-damaging to formations. However, this patent does not describe how to achieve propane or butane injection safely, or how to inject proppant into the propane or butane frac fluid. U.S. Pat. No. 5,899,272 also describes propane as a fracturing fluid, but the injection system described in that patent has not been commercialized. Thus, while propane and butane are desirable fluids for fracturing due to their volatility, low weight and easy recovery, those very properties tend to make propane and butane hazardous.

SUMMARY

According to an embodiment of a liquefied petroleum gas (LPG) frac system, there is provided an apparatus for fracturing a formation penetrated by a well. A frac pressure pump is connected to a well. A frac fluid source is connected to supply a stream of frac fluid comprising propane and/or butane to the frac pressure pump. In one embodiment, a proppant supply source containing proppant is connected to supply proppant into the stream of frac fluid from the frac fluid source. In some embodiments, the proppant supply source is a positive pressure vessel, and in other embodiments includes centrifugal pumps. An inert gas source is connected to supply inert gas to the pressure vessel and other system components. A controller controls operation of the system components, such as frac fluid source, proppant supply source, inert gas source and frac pressure pump to supply a stream of frac fluid to the well.

Propane and butane provide the advantages of liquified gases for fracs, while also providing higher viscosity than carbon dioxide for carrying proppant deep into the formation. This property of propane and butane provides an effective frac extension. The propane or butane is then vaporized and becomes mixed with the formation gas. The propane or butane can then be produced with the formation gas. Pentane and minor amounts of other hydrocarbons may also be included in the frac fluid.

According to a further embodiment of an LPG mix frac, there is provided a method of fracturing a well using an LPG mix as a frac fluid. Inert gas such as nitrogen is used as a gas blanket and pressure test fluid to ensure the safety of using LPG as the frac fluid. When nitrogen is added to the frac fluid, the method has particular utility for fracturing coal or shale formations.

These and other aspects of an LPG mix frac are set out in the claims, which are incorporated here by reference.

BRIEF DESCRIPTION OF THE FIGURES

Embodiments will now be described with reference to the figures, in which like reference characters denote like elements, by way of example, and in which:

FIG. 8 shows the inlet side of a proppant station housing a proppant introduction system for the fracturing system of FIG. 8;

FIG. 9 shows the outlet side of a proppant station housing a proppant introduction system for the fracturing system of FIG. 8.

DETAILED DESCRIPTION

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Figure 1:
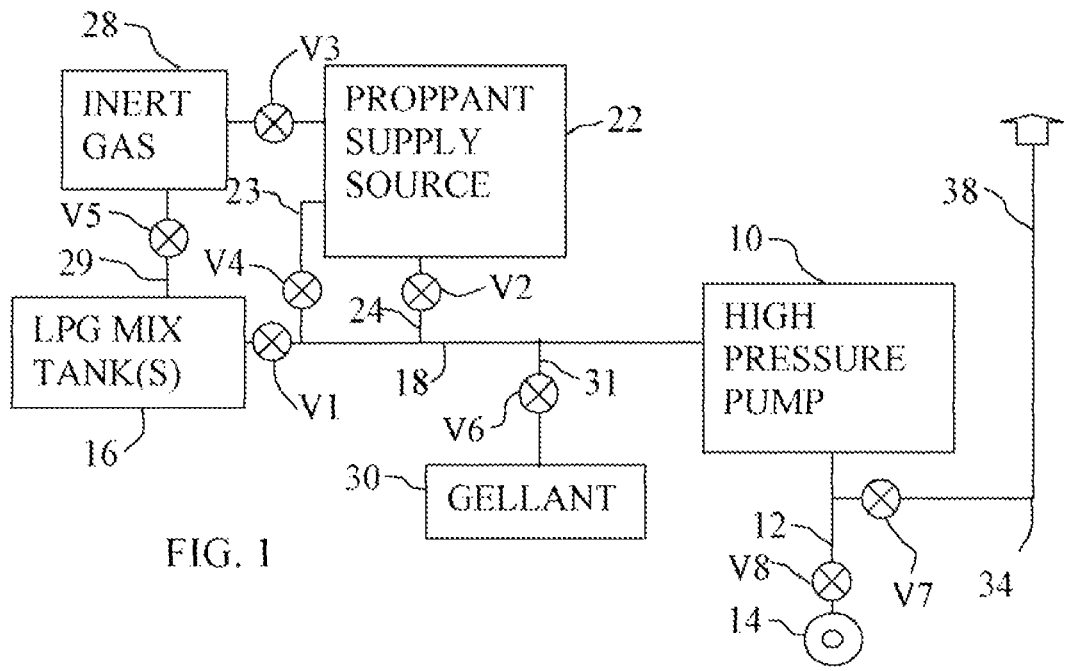
FIG. 1 is a diagram that illustrates the main components of a fracturing system according to a first embodiment of an LPG mix frac.

Referring to FIG. 1, an apparatus is shown for fracturing a formation penetrated by a well. A frac pressure pump 10, which could be one or more pumps mounted on one or more trailers, is connected via a conduit 12 to a well 14. Conduit 12, like all other conduits shown in FIG. 1, is a conventional pipe or hose with a pressure rating and anti-corrosion capability suitable for the pressures to be applied to the pipe. The pressure applied by the frac pressure pump 10 is a pressure suitable for fracturing the formation. An example frac pressure pump is a diesel quinflex pump with water cooled turbines, or an electrically powered triplex piston pump, but any suitable pump may be used. More than one pumping device may be used as the pump 10.

A frac fluid source 16 is connected to supply a stream of frac fluid comprising a pressurized LPG mix of propane, butane, or a mixture of propane and butane to the frac pressure pump 10 through conduit 18 and propane control valve V1 on conduit 18. For cost effectiveness, it is likely that the frac fluid in practice will be a predominantly propane and butane mix since it is expensive to separate propane and butane. The LPG mix may also contain minor amounts of pentane and higher hydrocarbons. Control valve V1 controls the flow of frac fluid from the frac fluid source 16. The valve V1 is also a conventional valve for the control of the frac fluid flow. The frac fluid source 16 is one or more of propane, butane, or propane and butane tanks at a pressure suitable for supplying propane and/or butane to the frac pressure pump 10, as well as carrying proppant in the stream in conduit 18. The frac fluid source 16 is maintained at a pressure of about 50 psi to 100 psi, and may go as high as 250 psi in one embodiment. As the frac fluid from the frac fluid source 16 is depleted during a frac, it may be heated to maintain vapor pressure or pressured with an inert gas such as nitrogen in order to maintain sufficient pressure in the frac fluid source 16 to be able to supply a stream of frac fluid carrying proppant to the frac pressure pump 10. The propane and/or butane may together comprise 50%, 80%, 90%, 95% and up to 100% by volume of the LPG mix frac fluid.

A proppant supply source 22 containing proppant is connected to supply proppant through conduit 24 into the stream of frac fluid in conduit 18. In one embodiment, the proppant supply source 22 is a positive pressure vessel, which should be capable of withstanding operating pressures, which, for example, a sufficient pressure may be above 200 psi for safe operation. The term positive pressure means that the pressure vessel has a higher operating pressure than atmospheric pressure. Flow of proppant from the proppant supply source 22 is controlled by a proppant control valve V2. The frac fluid source 16 is also preferably connected via conduit 23 and valve V4 to supply frac fluid to the proppant supply source 22. In one embodiment, a pressure vessel used as the proppant supply source 22 may be oriented to supply proppant by gravity through control valve V2, or via one or more augers lying within and along the bottom of the proppant supply source 22 or lying outside of the proppant supply source 22. Other metering systems for proppant delivery from the proppant supply source into the frac fluid stream may be used, such as various kinds of pumps. The proppant supply source 22 may be compartmentalized in order to provide different meshes of sand or other proppant, as indicated in the frac program below. Alternatively more than one proppant supply source 22 may be provided to provide more proppant for bigger fracs, or for different sizes of proppant. The proppant supply source 22 may also be a pressure contained pump system, such as described in relation to FIGS. 4 and 5.

An inert gas source 28 is connected to supply inert gas to the proppant supply source 22. The supply of inert gas is controlled by an inert gas control valve V3. A preferred inert gas is nitrogen. The inert gas should be at a sufficient pressure to keep LPG mix frac fluid as a liquid, prevent back flow of LPG mix frac fluid into the proppant supply source 22 and assist in driving the frac fluid to the high pressure pump(s) 10. The inert gas source 28 may also be connected to supply a controlled amount of inert gas via line 29 and valve V5 to the frac fluid source 16. Gelling fluid for the frac fluid may be supplied from gelling fluid source 30 through line 31 with valve V6 to frac fluid line 18. The gelling fluid is supplied to the frac fluid before the frac pressure pump 10 and may be supplied before or after the proppant source 22. The gelling fluid, including activator and breaker, may be any suitable gelling fluid for gelling propane or butane. The gelling agent in the gelling fluid may be any suitable gelling agent for gelling propane, butane, pentane or mixtures of propane, butane and pentane, and may be tailored to suit the actual composition of the frac fluid. One example of a suitable gelling agent is created by first reacting diphosphorous pentoxide with triethyl phosphate and an alcohol having hydrocarbon chains of 3-7 carbons long, or in a further for example alcohols having hydrocarbon chains 4-6 carbons long. The orthophosphate acid ester formed is then reacted with aluminum sulphate to create the desired gelling agent. The gelling agent created will have hydrocarbon chains from 3-7 carbons long or, as in the further example, 4-6 carbons long. The hydrocarbon chains of the gelling agent are thus commensurate in length with the hydrocarbon chains of the liquid petroleum gas used for the frac fluid. This gelling agent is more effective at gelling a propane or butane fluid than a gelling agent with longer hydrocarbon chains. The proportion of gelling agent in the frac fluid is adjusted to obtain a suitable viscosity in the gelled frac fluid.

For release of frac fluid in the various lines, a frac discharge line 34 is provided leading to flare stack 38. Flow in the frac discharge line 34 is controlled by one or more discharge valves V7. Flow in the line 12 to the well 14 is controlled by wellhead control valve V8. Nitrogen will typically be stored as refrigerated liquid nitrogen and supplied to the various lines shown in the figures through a heat exchanger in order to provide pressure to the frac fluid tanks 16, and proppant supply source 22. The heat exchanger should be maintained at a safe distance from the LPG equipment. Proppant supply sources 22 may be supported on legs with load sensors to give an indication of the amount of proppant remaining, and thus also an indication of the amount of proppant delivered to the well.

Figure 2:
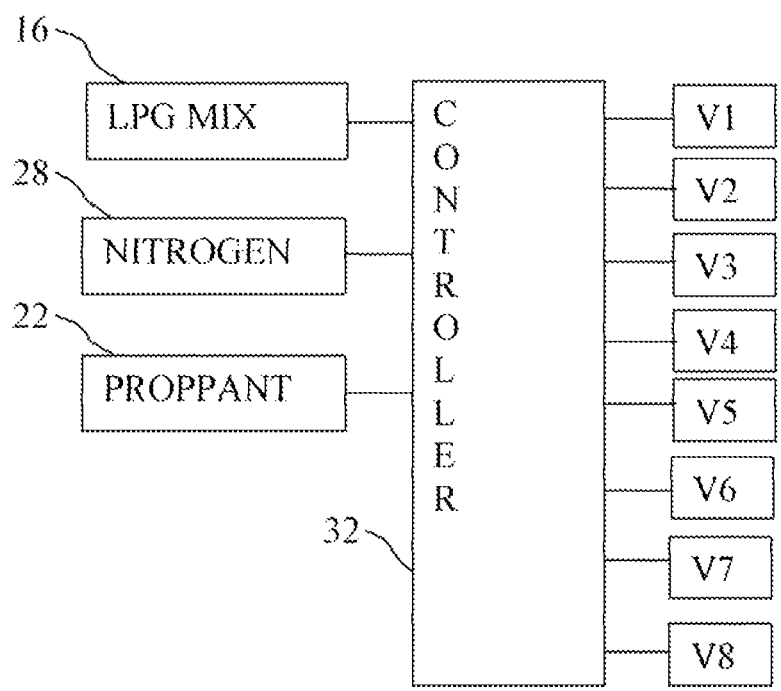
FIG. 2 is a diagram that illustrates a controller for the fracturing system of FIG. 1.

As shown in FIG. 2, a controller 32 is connected to control the operation of the frac fluid control valve V1, proppant control valve V2, inert gas control valve V3, and frac pressure pump 10, in order to supply a stream of proppant and frac fluid to the well. The controller 32 is also connected to valves V4, V5, V6, V7, V8, V9 and other required valves in order to control their operation. The valves V1-V9 may thus be remotely operated so that they may be controlled during an emergency without exposing personnel to a hazard. The controller 32 is any suitable computer or processor, equipped with conventional displays and operator input console. The lines indicating connection between the controller 32 and the controlled parts represent conventional control lines. The entire system is remotely controlled via the controller 32. The controller 32 carries out frac process algorithms that are conventional except as described in this patent document. The controller 32 also is connected by control lines to pumps (not shown) that may, in some embodiments, be associated with the gelling fluid source 30, proppant supply source 22 and inert gas source 28.

During operation of the apparatus shown in FIGS. 1 and 2, the controller 32 is used to carry out the following steps. Proppant is added to the proppant supply source 22 through, for example, a suitable hatch, which is then closed afterwards. The proppant may be any natural or artificial proppant. A hopper (not shown in FIG. 1, but see FIGS. 9 and 10 for an example) or other suitable device may be used to add proppant to the proppant supply source 22. Well 14 is closed using valve V8. Inert gas is injected from inert gas source 28 into proppant supply source 22 to form a gas blanket by opening valve V3. Inert gas is also injected from inert gas source 28 into all system components that will come into contact with the LPG mix, including lines 12, 18, 24, 29, 31 and 34, valves V1-V8, frac pressure pump 10, and the system components, to clean out any air and to pressure test for leaks. Leaks may be detected by sight, smell, sound or electronic devices such as sniffers and laser devices. Only when the system has been pressure tested may frac fluid be injected into the system components.

The frac fluid source 16 is typically pre-pressurized to 50 psi to 100 psi, but the frac fluid source 16 may also be charged on site from a separate propane and/or butane source. Once the system has been pressure tested for safety, including pressure testing with LPG mix, the wellhead control valve V8 is opened. The flare system may be tested with a burn. Frac fluid control valve V1 is opened under control of controller 32 to supply frac fluid to the frac pressure pump 10, and the frac pressure pump 10 is turned on to fill up the well with the LPG mix. Gellant is added from gel source 30 through line 31 to the frac fluid in conduit 18 by opening valve V6 while the well is being filled with frac fluid. The pressure on the well 14 is then gradually increased using the frac pressure pump 10, and an injection rate is established to gradually increase pressure on the frac fluid in the well 14, and to continue to fill the well with frac fluid. A pad of frac fluid in the liquid state is thus applied to the well 14 to commence the frac. Frac pads are well known in the art, and may consume a variable portion of the frac fluid depending on the frac procedure for the well that has been decided by the operator. The frac pressure is gradually increased to break down the formation and allow the fractures to propagate into the formation.

After the pad has been injected into the well 14, proppant is added to the frac fluid stream. In one embodiment, control valve V4 is opened under control of controller 32 to supply liquid frac fluid into the proppant supply source 22. The liquid frac fluid mixes with the proppant in the proppant supply source 22. Proppant control valve V2 is then opened to allow proppant to enter the frac fluid stream in conduit 18, by force of gravity or mechanical methods such as by using an auger. Pressure from the inert gas source 28 may be required to force the LPG mix and proppant into the conduit 18. A pump (not shown) may also be required on line 23 to ensure supply of frac fluid into the proppant supply source 22 to oppose the pressure from the inert gas source 28. In another embodiment, the control valve V4 is not opened, but proppant is supplied directly from the pressure vessel 22 into the line 18 by gravity and use of an auger at the outlet of the pressure vessel 22. In this embodiment, an overbalance of inert gas from source 28 may be applied to the pressure vessel 22 to prevent frac fluid flow back into the pressure vessel 22. Other pressure contained methods may be used to inject proppant into the LPG mix frac; for example as discussed below in relation to FIGS. 4 and 5. Frac pressure pump 10 then pumps the proppant containing gelled frac fluid stream into the well 14. The amount of proppant to be added is determined by the frac operator.

At a suitable point during the frac, when the frac operator determines that enough proppant has been added to the well, the well head is closed, and inert gas such as nitrogen is again used to purge all the components, including all the lines, valves, pumps and tanks that have come into contact with the LPG mix, other than the propane/butane tanks, in order to remove all propane and butane from the system components.

After an amount of time determined by the operator as being suitable for the well being fractured, the pressure is released from the well. The gel is timed to break at about the same time (typically 2-4 hours). Liquid frac fluid in the well then vaporizes due to loss of pressure and heat absorption from the reservoir. The gaseous propane and/or butane in the well mixes with formation gas, and is easily displaced to the surface by the heat and pressure of the formation, leaving behind proppant in fractures created by the frac pressure. The propane and/or butane gas that is released from the well may be produced or supplied to gas discharge line 34 where they may be burned through flare stack 38, or produced or flowed into a gas pipeline for sale to others. As is conventional, in any of the embodiments of FIG. 1, 3 or 8 a density meter may be provided on the line 12 to provide feedback to the frac operator on the amount of proppant and frac fluid entering the well.

As frac fluid is extracted from the frac fluid source 16, a controlled amount of inert gas may be added to the frac fluid source 16 to replace the frac fluid using valve V5, maintain pressure in the frac fluid source 16, and to assist in reducing the risk of explosion.

The gas frac may also be carried out on coal or shale seams to enhance the production of coal gas or shale gas. In a coal gas frac or shale gas frac, the hydrostatic head on the producing formation must be reduced to a minimum. Nitrogen has been used for this purpose, with high volumes in the order of 70,000 m$^3$ per frac, and correspondingly high flow rates. In the application of a gas frac to a coal or shale formation, the LPG mix is blended with nitrogen.

Figure 3:
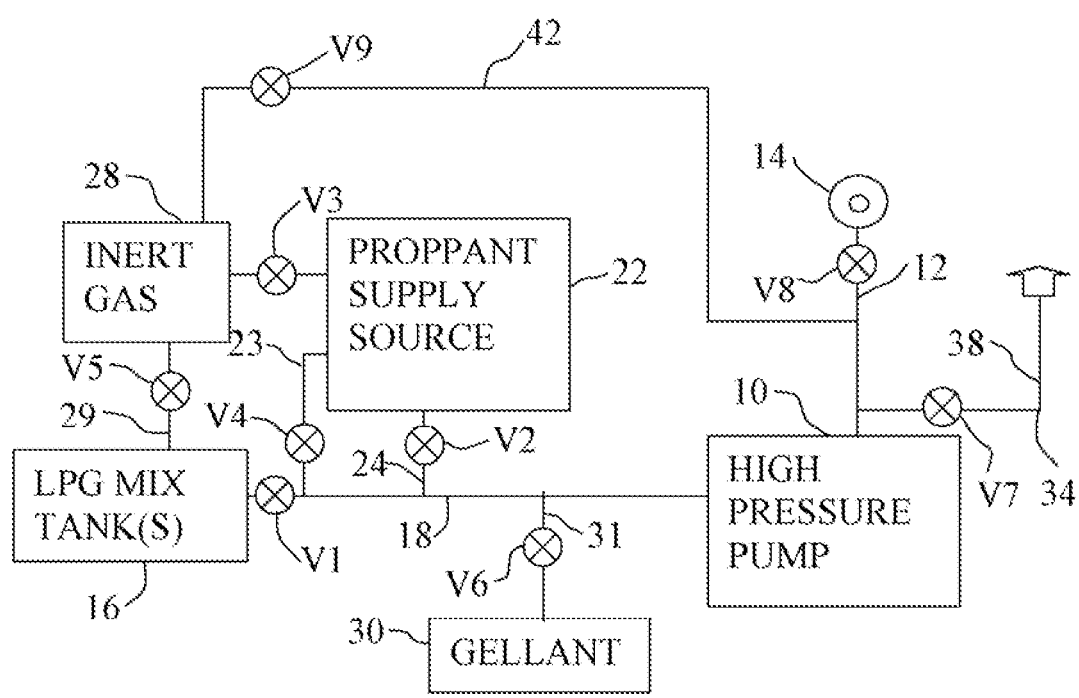
FIG. 3 is a diagram that illustrates the main components of a fracturing system according to an embodiment of an LPG mix frac for fracturing a shale or coal bed formation.

As shown in FIG. 3, in an embodiment of an LPG mix frac applied to a coal or shale formation, inert gas source 28 is connected to line 12 through conduit 42 under control of valve V9 to supply nitrogen to the well. The same safety procedures and equipment are employed as were employed for the fracturing using the apparatus of FIG. 1, and as described above. As well, proppant introduction into the frac fluid stream may use various devices, such as those shown in FIGS. 4, 5 and 6. In general, the frac is carried out using conventional procedures for the fracturing of coal or shale formations with nitrogen, with the addition of using an LPG mix fluid to carry proppant into the coal or shale formation.

In some embodiments of an LPG mix frac of a coal or shale formation, when the formation has been pressurized by a high flow of high pressure nitrogen, (using nitrogen from source 28 supplied into the well 14 in order to create fractures in the formation) valve V1 is opened and the pump 10 activated to pump LPG frac fluid into the nitrogen stream entering the well 14. The LPG mix in conduit 18 is gelled with gellant from gellant source 30. When a desired amount of gelled LPG frac fluid has been pumped into the well 14, valve V4 is opened, in one embodiment, to allow frac fluid to flow into proppant supply source 22. In one embodiment, inert gas is also supplied from inert gas source 28 into the proppant supply source 22. Upon opening valve V2, proppant flows into the conduit 18 and mixes with the frac fluid. A pump (not shown) may be required on line 23 to ensure a supply of frac fluid into the proppant supply source 22, by opposing the pressure from the inert gas source 28. Pump 10 then pumps the gelled LPG frac fluid containing proppant into the nitrogen stream entering the well 14. The resultant gelled nitrogen-LPG mixture may carry proppant from proppant source 22 into the well and into the reservoir. Once sufficient proppant has been delivered to the well 14, the addition of proppant is terminated. LPG frac fluid may continue to be added after termination of the proppant flow. The ratio of nitrogen to frac fluid from the frac fluid source 16 is controlled according to the desired amount of proppant desired to be placed in the formation. At a controlled time, about when the gel breaks, the pressure provided by the pump 10 and inert gas source 28 is reduced to allow flow back. The LPG mix in the well 14 that has carried proppant into the fractures generated by the frac fluid and nitrogen then gasifies, and may be produced from the well 14 along with the nitrogen and formation gas. Proppant remaining behind in the formation enhances permeability of the coal or shale formation, but the use of LPG and nitrogen provides low hydrostatic gas pressure that allows the formation to continue to produce gas.

An example is now given of a 30 tonne proppant propane-butane down tubing fracture treatment of a well with perforations at 2500 m depth, having 129.7 mm 23.06 kg/m casing, 88.9 mm, 12.84 kg/m tubing and BHT of 89 deg C. The treatment objective is to stimulate the gas formation at the level of the perforations by performing a 31 tonne gelled Propane Butane Treatment. The design criteria for the frac specify:

Acid Spearhead: 1 m3 15% HCl Acid Spearhead
Proppant: 1 Tonnes 50/140 Sand
Proppant: 30 Tonnes 30/50 EconoProp
Base Fluid Required: 117.0 m3 Propane/Butane
Maximum Fluid Rate: 4.0 m3/min
Est. Pumping Pressure: 37.9 MPa
Maximum Fluid Power Required: 2525 kW Normal pre-treatment, safety and operational procedures are carried out, including conducting a pre-treatment safety and operational meeting with all personnel on location, detailing: treatment procedures, personnel responsibilities, designated safe areas, pressure limitations, safety precautions, position of safety equipment, safety and evacuation plan, and an identification of hazards.

Additional on-site preparation includes rigging in the fracturing equipment to pump down tubing, rigging-in the annulus pumper to hold back pressure for the treatment, setting the annulus pressure relief valve, and pressure testing the surface lines to the pressure limit set by the well operator.

The gas frac is performed according to the Proppant Fluid Schedule below, including acid spearhead. If a screen-out occurs, pumping should not be not re-initiated. The well should be flushed with the specified fluid volume as calculated with a 0.5 m$^3$ underflush. At the end of the flush, all pumps should be shut down, the ISIP recorded, and the gas frac equipment rigged-out. Post-treatment procedures include: flow well back at controlled rates as soon as is safely possible. Ensure that the well is flowed back following regulatory guidelines. Continue to flow until well has cleaned up. Place well on production and evaluate results.

Proppant Fluid Schedule

| | Slurry | Fluid | | Proppant | | |
|---|---|---|---|---|---|---|
| Stage | Blender Rate (m3/min) | Fluid Rate (m3/min) | Cum Fluid (m3) | Stage Fluid (m3) | Blender Cond (kg/m3) | Prop Stage (kg) | Cum Prop (kg) |

| Stage | Blender Rate (m3/min) | Fluid Rate (m3/min) | Cum Fluid (m3) | Stage Fluid (m3) | Blender Cond (kg/m3) | Prop Stage (kg) | Cum Prop (kg) |
|---|---|---|---|---|---|---|---|
| 15% HCl Acid Spearhead | | | 1.0 | 1.0 | | | |
| Pad (P/B gel) | 4.00 | 4.00 | 18.0 | 18.0 | | | |
| Start 50/140 Sand | 4.00 | 3.85 | 28.0 | 10.0 | 100 | 1,000 | 1,000 |
| Pad (P/B gel) | 4.00 | 4.00 | 36.0 | 8.0 | | | |
| Start 30/50 EconoProp | 4.00 | 3.85 | 45.0 | 9.0 | 100 | 900 | 900 |
| Increase 30/50 EconoProp | 4.00 | 3.72 | 54.0 | 9.0 | 200 | 1,800 | 2,700 |
| Increase 30/50 EconoProp | 4.00 | 3.48 | 63.0 | 9.0 | 400 | 3,600 | 6,300 |
| Increase 30/50 EconoProp | 4.00 | 3.26 | 72.5 | 9.5 | 600 | 5,700 | 12,300 |
| Increase 30/50 EconoProp | 4.00 | 3.07 | 82.5 | 10.0 | 800 | 8,000 | 20,000 |
| Increase 30/50 EconoProp | 4.00 | 2.90 | 92.5 | 10.0 | 1,000 | 10,000 | 30,000 |
| Flush (P/B gel) | 4.00 | 4.00 | 103.6 | 11.1 | | | |

Treatment Fluid Requirements

| Frac Treatment | Hole | Prepad | Pad | Prop | Flush | Bttms | Total |
|---|---|---|---|---|---|---|---|
| (m3) Propane/Butane | | | 36.0 | 56.5 | 11.1 | 13.4 | 117.0 m3 |

On-The-Fly Chemical Additive Schedule

| | Frac Treatment | | | | | |
|---|---|---|---|---|---|---|
| Add to Propane/Butane | Hole Conc. | Prepad Conc. | Pad Conc. | Prop Conc. | Flush Conc. | Total Chem. |
| Gellant (P/B gel) L/m3 | | | 6.0 | 6.0 | 4.0 | 599.4 L |
| Activator L/m3 | | | 3.5 | 3.5 | 2.0 | 346.0 L |
| Liquid Breaker L/m3 | | | 3.0 | 3.0 | 5.0 | 333.0 L |

Ramp Proppant Schedule

| | Fluid | | Proppant | | |
|---|---|---|---|---|---|
| Stage | Cum Fluid (m3) | Fluid (m3) | Conc. (kg/m3) | Prop. (kg) | Cum Prop. (kg) |
| Prior Main Proppant | 36.0 | 36 | | | |
| Prior Inflection Point | 62.5 | 26.5 | 430 | 5,699 | 5,699 |
| After Inflection Point | 82.5 | 20.0 | 1,000 | 14,301 | 20,000 |

-continued

| | | | | | |
|---|---|---|---|---|---|
| Hold Stage | 92.5 | 10.0 | 1,000 | 10,000 | 30,000 |
| Flush | 103.6 | 11.1 | | | 30,000 |

Calculations

Depth to Top Perforation     2554.0 m
Frac Gradient     18.0 kPa/m
Friction Gradient     4.6 kPa/m
Specific Gravity of Frac Fluid     0.508
Blender Rate     4.00 m3/min
Bottom Hole Fracture Pressure: = Frac Gradient × Depth (BHFP) =
18.0 kPa/m × 2554 m = 45,970 kPa
Pumping Friction Pressure: = Friction Gradient × Depth (FP) =
4.6 kPa/m × 2554 m = 11,748 kPa
Hydrostatic Head: = Specific Gravity × 9..81 kPa/m × Depth (HH) =
0.508 × 9.81 kPa/m × 2554 m = 12,728 kPa
Surface Pumping Pressure: = BHFP + FP − HH (SPP) =
45,970 kPa + 11,748 kPa − 12,728 kPa = 44,990 kPa
Required Pump Power: = (SPP × Rate)/60 = (44,990 kPa × 4.00 m3/min)/60 = 2999 kW

Volume To Top Perforation

| | Length of Interval (m) | Volume Factor (m3/m) | Volume (m3) |
|---|---|---|---|
| Tubing = | 2554 | 0.00454 | 11.5 |
| Casing = | 10 | 0.012417 | 0.1 |
| Total (m3) | | | 11.6 |
| Underflush (m3) | | | 0.5 |
| Do Not Overflush | Flush Volume (m3) | | 11.1 |

Figure 4:
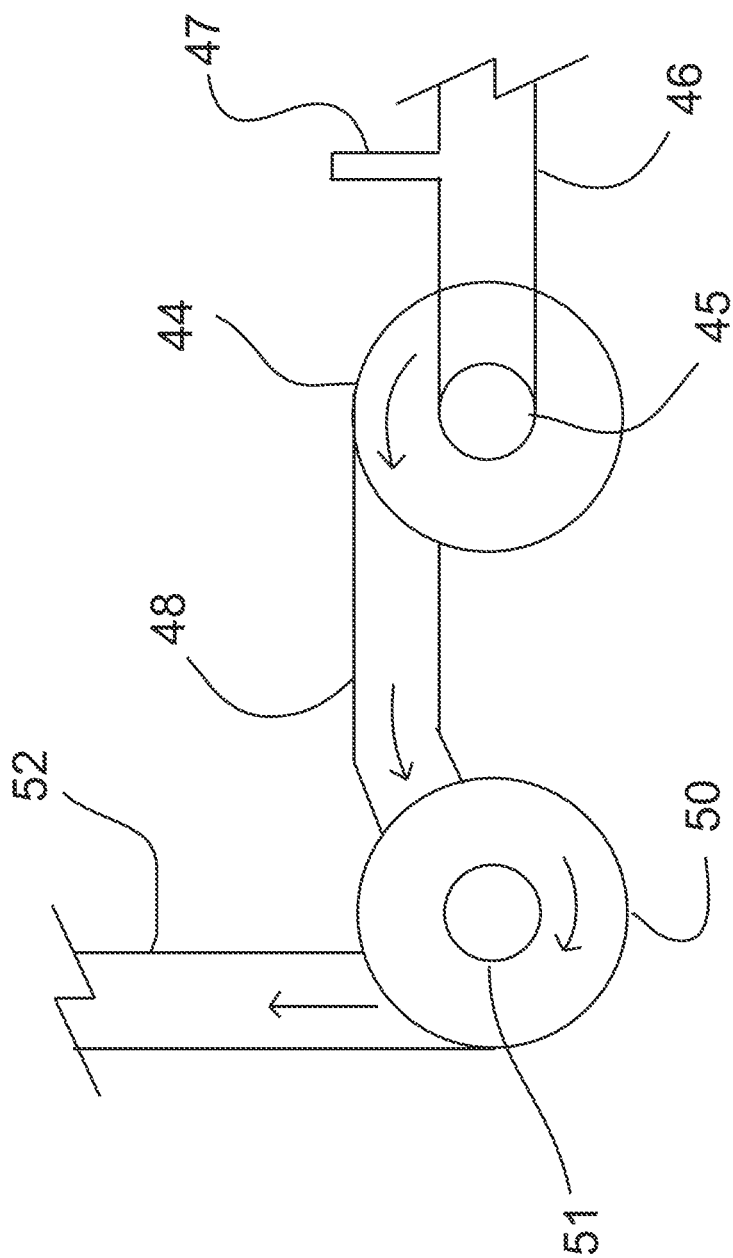
FIG. 4 shows a dynamic seal pumping system for pumping proppant and LPG mix into the high pressure pump.

FIG. 4 shows a proppant pumping system that may be used in an embodiment of an LPG mix frac for use as a proppant supply source 22. Centrifugal pump 44 is connected via line 46 to LPG mix supply 16. Output from centrifugal pump 44 is provided through line 48 to centrifugal pump 50. Centrifugal pump 50 is connected via line 52 to high pressure pump 10. Operation of the pump 44 provides suction at its entry port 45, which draws LPG mix into the pump 44. Pump 50 operates at higher rpm than pump 44, and pumps LPG mix in line 48 into line 52. Line 52 communicates with a conduit, such as conduit 18 in FIG. 1 leading to the high pressure pump 10. Pump 50 also establishes suction at its central entry port 51, which draws proppant from the proppant introduction system shown in FIG. 5. The centrifugal pump 50 functions as a pressure vessel in which the low pressure generated by the pump at the entry port 51 dynamically seals the pump 50 from releasing LPG mix back out of the entry port of the pump 50. For purging of the proppant pumping system shown in FIG. 4, a line 47 may be connected to the inert gas source 28. A valve on the line 52, equivalent to valve V2 in FIG. 1, controls the flow of LPG mix.

Figure 5:
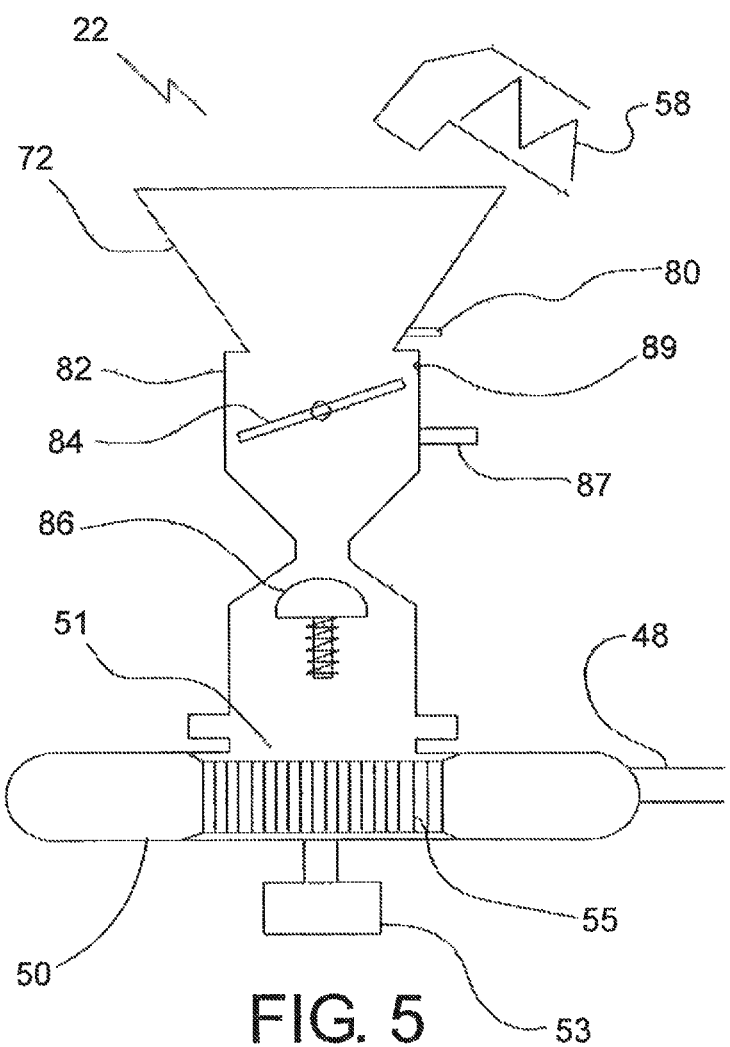
FIG. 5 shows another view of a dynamic seal proppant introduction system.
Figure 6:
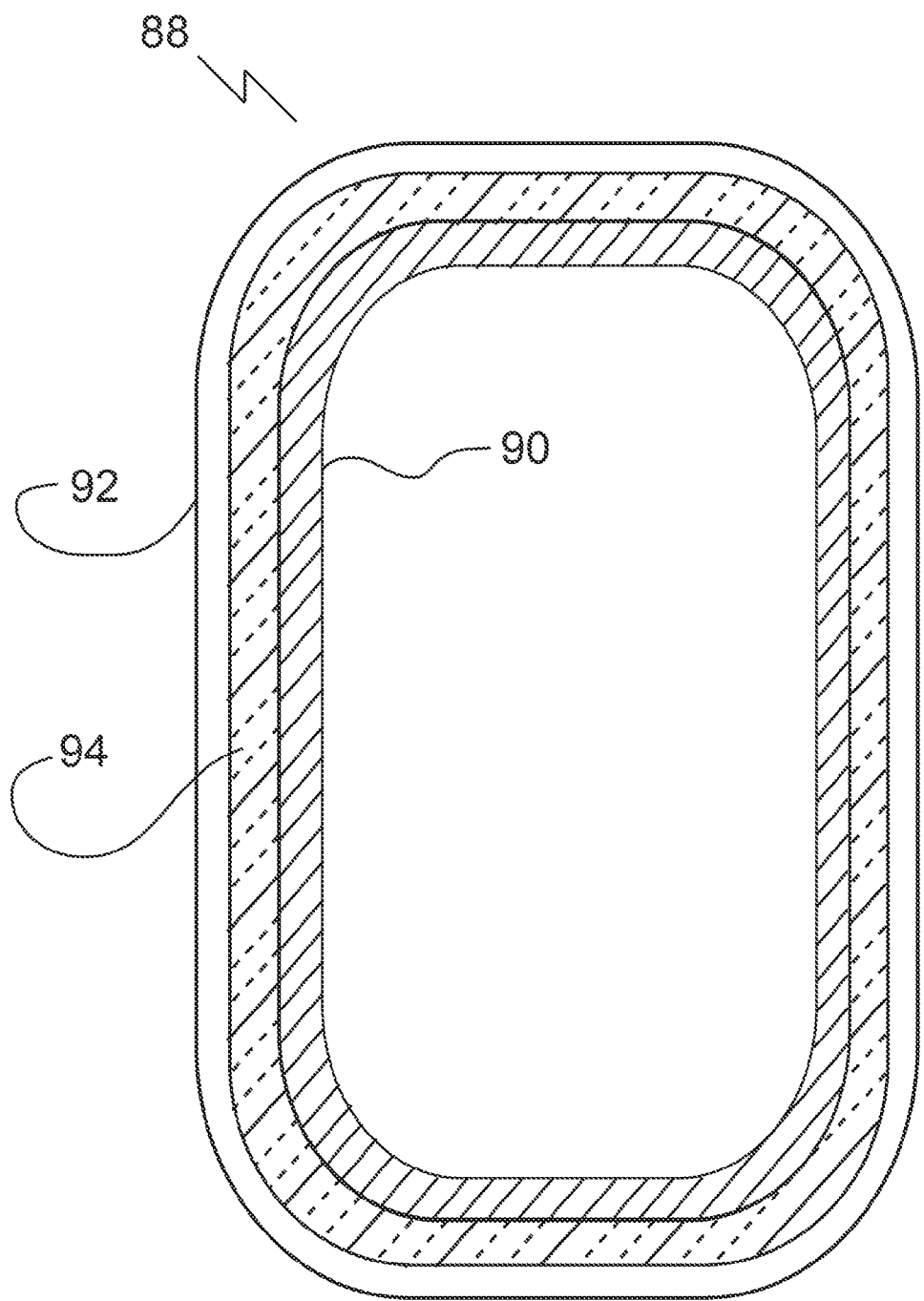
FIG. 6 shows a section view of an insulated LPG mix tank.

Detailed in FIG. 5 is a proppant supply system for the pump 50 of FIG. 4, which thus may function as a proppant supply source 22. Proppant is channeled into conical hopper 72 using auger 58. Nitrogen gas or CO2 can be supplied to the system through a nozzle 80, in order to maintain operating pressure or an inert atmosphere. Conical hopper 72 supplies proppant to inlet 82, where it passes a control valve 84 and a check valve 86. Pentane may be supplied by nozzle 87 since the proppant introduction efficiency improves if the line is wet, In this embodiment, proppant enters pump 50 by traveling through inlet 51. Pump 50 operates as shown in FIG. 4, drawing frac fluid into pump 50 from line 48 by centrifugal force, where it mixes with proppant. Pump 50 is powered by motor 53, which turns impeller 55. In FIG. 5, the frac fluid is supplied into pump 50 by line 48, which comes from LPG mix supply 16, as described in relation to FIG. 4. As shown in FIG. 4, the mixture of proppant and frac fluid is then sent out of pump 50 into line 52. The outer ring of the centrifugal pump 50 is known as a volute. The spinning impeller 55 creates a centrifugal force that generates a dynamic seal around the circumference of the impeller 55. This maintains pressure in the volute of the pump 50. The speed of the impeller 55 and the inlet flow pressure must be controlled at a balance to prevent backflow through the impeller 55.

Referring to FIG. 5, under the normal operating pressures of the system, check valve 86 remains open and permits a steady flow of proppant into pump 50. In the event that pump 50 fails or is shut down, the immediate increase in pressure within entry port 51 will cause check valve 86 and control valve 84 to close. An increase in pressure would cause the LPG mix to break the dynamic seal and cause back flow through the proppant entry, forming a flammable gaseous mixture that may create a hazardous situation. By inserting valves 84 and 86, this hazardous situation may be averted. Control valve 84 is operated hydraulically by remote through controller 32. A gas sensor 89 may be installed above control valve 84 that would inform controller 32 to close control valve 84 in the event of a gas surge back through the system. Check valve 86 and control valve 84 may operate automatically in response to pressure changes, or may be under computer control by controller 32. Control valve 84 functions as a backup valve for check valve 86. Any other combination or use of valves may be incorporated to achieve the function of check valve 86 and control valve 84. Before and after a frac, the proppant introduction system of FIGS. 4 and 5 may be purged by introduction of nitrogen through lines 47 and 80. The apparatus of FIG. 5 may also be used to deliver frac fluids, such as higher vapor pressure hydrocarbons, such as C5, C6, and C7 hydrocarbons, liquid CO2, and alcohols, to a high pressure frac pump. Supply of such fluids from the frac fluid source to the centrifugal pump 50 may be supplied by using inert gas as a driving fluid or using a suitable pump. These other fluids may also be mixed with LPG mix frac fluid and stored in the frac fluid source 16, or in the case of carbon dioxide, in separate carbon dioxide tanks.

In another embodiment, the LPG mix is cooled before introduction into the well to lower its vapour pressure. In order to maintain a pressurized LPG mix of propane, butane or a mixture of propane and butane in a liquid state, pressures on the order of about 50 psi to 250 psi are required. This is because both propane and butane are gases at room temperature and atmospheric pressure. By cooling the LPG mix before introducing it into the fracturing system, reduced pressures are required, which diminishes the potential for explosions or damage to the fracturing system that could be caused by high pressures. Cooling may prevent vapor lock of piston pumps. In order to easily maintain the LPG mix in a cooled state, the LPG mix may be stored in an insulated tank 88, as detailed in FIG. 6. Insulated tank 88 has a metal shell 90, which is surrounded by an insulating layer 92. A secondary layer 94 may surround insulating layer 92, and may be formed of metal, plastic, or any other suitable material. Insulated tank can be mounted on the back of a trailer for a truck, or as part of a trailer. Alternatively, insulated tank 88 may be a removable tank. All the components that make up the frac fluid, including gellant source 30, may be stored in insulated tanks similar to insulated tank 88. The secondary layer 94 may be a flexible shell placed around the tank 88, and the insulating layer 92 may be sprayed insulating foam that is injected into the flexible shell 94. The insulated tank 88 has several advantages. LPG delivered to the tank 88 will typically be at a cool temperature of about 10-20 degrees C., and remain cool since the insulated tanks 88 will keep the LPG at nearly the same temperature throughout the frac process. Thus, even on a hot day, problems of the LPG heating up and causing vapor locks at the piston pumps can be avoided. In winter, problems with low pressure due to cooling of the LPG, such as the need for heating, are also avoided.

Figure 7:
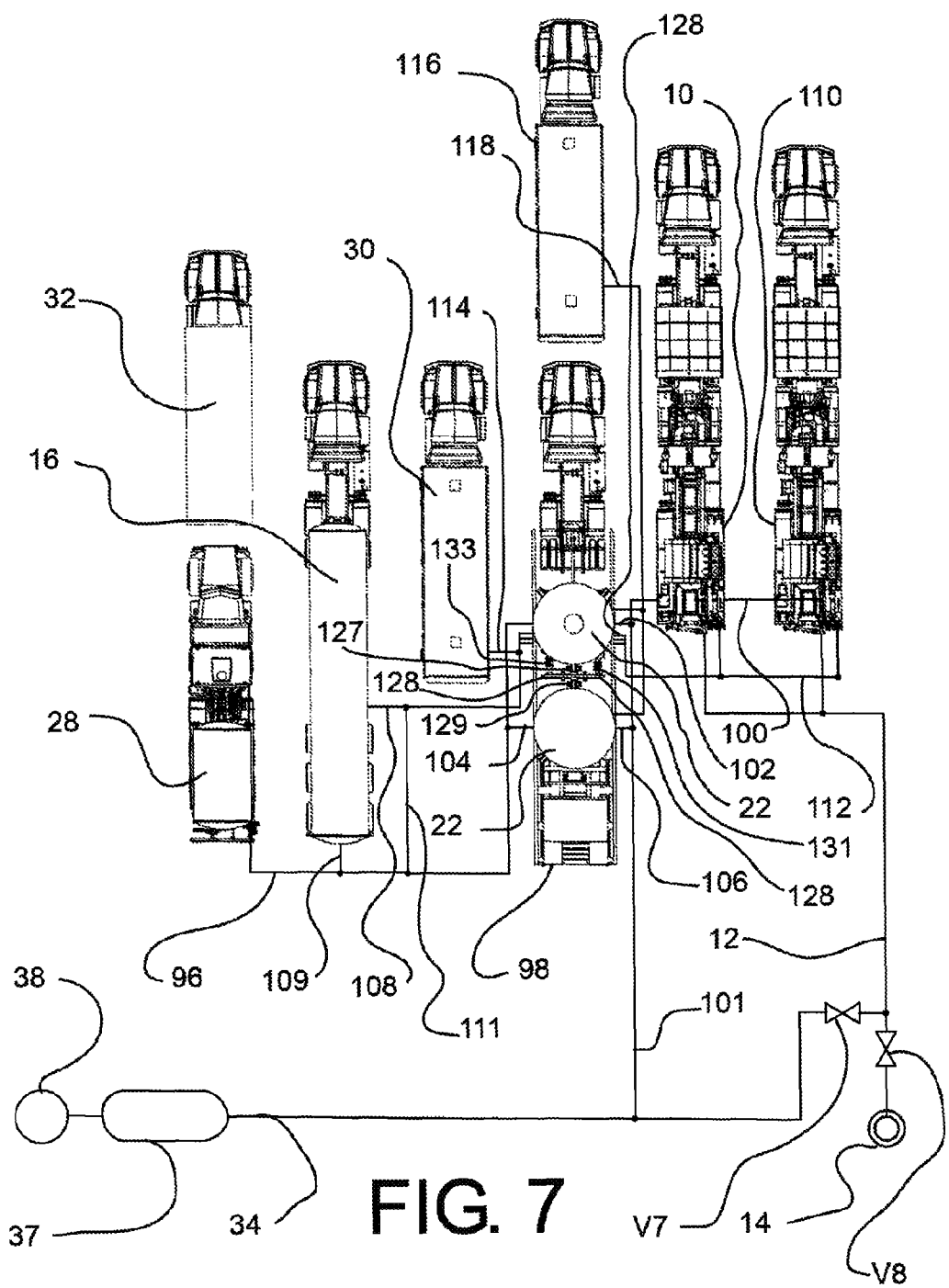
FIG. 7 is a diagram that illustrates the main components of a fracturing system according to another embodiment of an LPG mix frac.

FIG. 7 shows another embodiment of an LPG mix frac system, where each component of the fracturing process is mounted on a series of trucks that carry the inert gas source 28, frac fluid source 16, proppant sources 22, chemical unit 30 and pumps 10 and 110. Alternatively, each component may be stored as any other type of portable or permanent unit. A line 96 connects inert gas source 28 to proppant station 98, and a branch 111 of line 96 connects the inert gas source 28 to frac fluid supply line 108. Proppant station 98 includes proppant supply sources 22, and line 96, along with branch 104 of line 96, can be used to supply inert gas to proppant supply sources 22. Inert gas outlets 102 and 106 from the proppant sources 22 connect to line 101 that leads out to flare stack 38. Inert gas may be supplied to the pumps 10 and 110 through lines 96, 111, 108, 133, 128, 131 and 112, and returned to the flare stack 38 through lines 100 and 101.

LPG mix source 16 can supply LPG mix fluid to proppant station 98 through lines 108, inlet ports 134, line 133 and central line 128, forming a frac fluid stream. Line 108 may be formed as a group of three lines connected to the three inlet ports 134 as shown, thus providing different flow rates of frac fluid. LPG mix fluid consists of a LPG mix as described for the above embodiments. Inert gas may be supplied to LPG mix source 16 through line 109. Inert gas can be supplied to the frac fluid stream in line 108 through line 111. Upon supplying LPG mix fluid to proppant station 98, proppant from proppant supply source 22 can enter the frac fluid stream and mix with LPG mix.

Proppant is supplied along conduits 127 and 129, which contain augers that receive proppant from the respective conical lower ends of the proppant supply sources 22. The augers in lines 127 and 129 convey the proppant to the central frac fluid line 128. Gellant may be supplied from chemicals trailer 30 along line 114 to one or more of the lines 108 or to line 128 before or after the conduits 127 and 129. The frac fluid stream can then flow to either or both high pressure pump 10 and high pressure pump 110 through line 128, line 131, output ports 130 and line 112. Alternatively, only LPG mix can be sent to pumps 10 or 110 through the same lines and ports, without proppant or gellant added. Proppant is supplied when needed to proppant supply source 22 from a proppant supply truck 116 through line 118. Typically, this will be carried out early in the frac process and then the truck 116 may depart.

In this embodiment, frac fluid can be supplied to pumps 10 and 110, as described in previous embodiments. Inert gas can also be supplied to any individual component of the system, as well as used to purge the entire system as a whole before and after commencing a frac. Inert gas can be supplied to either or both of pumps 10 and 110 through line 112. Pumps 10 and 110 are connected in parallel to the frac fluid stream through line 112. Pumps 10 and 110 can send frac fluid to a well 14 through line 12. Flow in line 12 to well 14 is controlled by wellhead control valve V8. Alternatively, pumps 10 and 110 can send frac fluid to a flare stack 38 through line 34. Line 34 is also connected to line 101, so that the entire system can be easily cleared of frac fluid through flare stack 38 after a frac. Line 34 also connects to a sand clean-out tank 37 before it reaches flare stack 38. Sand clean-out tank 37 prevents proppant from being sent to flare stack 38, and stores it within its capacity. Gellation chemicals may also be recovered in clean out tank 37. A chock may be provided in line 34 to hold pressure on propance and keep it liquid during flow back. Flow in line 34 is controlled by one or more discharge valves V7. Many other combinations of supply lines and connections can be used to accomplish the method and apparatus described for supplying a LPG mix frac to a well 14, within the scope of the methods and apparatus claimed here. The same safety procedures and equipment are employed as are employed for fracturing using the apparatus of the embodiments described above. As well, proppant introduction into the frac fluid stream may use various devices, such as those shown in FIGS. 1, 4 and 5. The frac system as described above is controlled remotely by controller 32. Controller 32 may consist of a computer control station situated on a trailer. In general, the frac is carried out using conventional procedures for the fracturing of any formation, modified according to the techniques described here.

FIGS. 8 and 9 show a more detailed view of the inlet side and outlet side, respectively, of proppant station 98. In these views, proppant station 98 is provided as a flatbed trailer 120 for a semi-trailer truck, although other vehicles or devices could be used to accomplish the same purpose. In this embodiment, trailer 120 contains two proppant supply sources 22, which have at least one of the gas connections 122 connected to inert gas source 28. For example, upper gas connections 122 of one proppant supply 22 may function as an inlet for inert gas, connecting to inert gas supply 28, while the lower gas connection 122 may function as an outlet for inert gas, sending inert gas to line 101 through either line 102 or 106. Each proppant supply source 22 is a positive pressure vessel, used for storing proppant. Manhole covers 124 and connections 126 are positioned on each proppant supply 22, with the connections 126 used to refill proppant supply 22.

Referring to FIG. 9, frac fluid is supplied to inlet ports 134 and then through line 133 to central frac fluid line 128. At the other side of the proppant station 98, frac fluid line 128 connects through line 131 to outlet ports 130. Gellant may be supplied to the frac fluid lines at any suitable point from line 114. Augured lines 127 and 129 convey the proppant from the base of the conical hoppers 22 into the central frac fluid line 128. In both FIGS. 9 and 10, pressure meters 136 are positioned on respective lines 131 and 133 to monitor the pressure of the frac system before and after the proppant supply lines 127 and 129. Mixing of the gellant with the frac fluid can occur at or before proppant station 98 or somewhere between proppant station 98 and pumps 10 and 110.

The system of FIGS. 7-9 may be used as described in relation to FIGS. 1-3. Proppant source 22 is loaded with proppant, for example, sand. Inert gas is supplied from the inert gas source 28 through all operational lines to purge the system of volatile components and for pressure testing. In one embodiment, inert gas is supplied to the cone vessels 22 so that the pressure in the cone vessels 22 is greater than the pressure in the LPG tanks 16. Inert gas is then run through the pumpers 10 and 110. Next, frac fluid is supplied through lines 108, 133, 128, 131 and 112 as required by the frac program, beginning with a frac fluid pressure test. Gellant is supplied as required through line 114 and proppant is supplied by the augered lines 127 and 129 when required by the frac program. LPG mix returned from the well 14 may be flared. At the conclusion of the introduction of frac fluid into the well, when sufficient proppant has been introduced to the formation, inert gas is again supplied to all operational lines and out through line 34 to the flare stack 38 to purge liquefied petroleum gas from the system components. Inert gas is bled from system components. The well is then flowed back to allow gaseous LPG to be produced or flared. Where a sales line exists, the LPG mix may instead of flaring be supplied to the sales line. A pop valve may be placed on line 112 to prevent excess pressure in line 112 damaging the pressure vessels 22.

Figure 10:
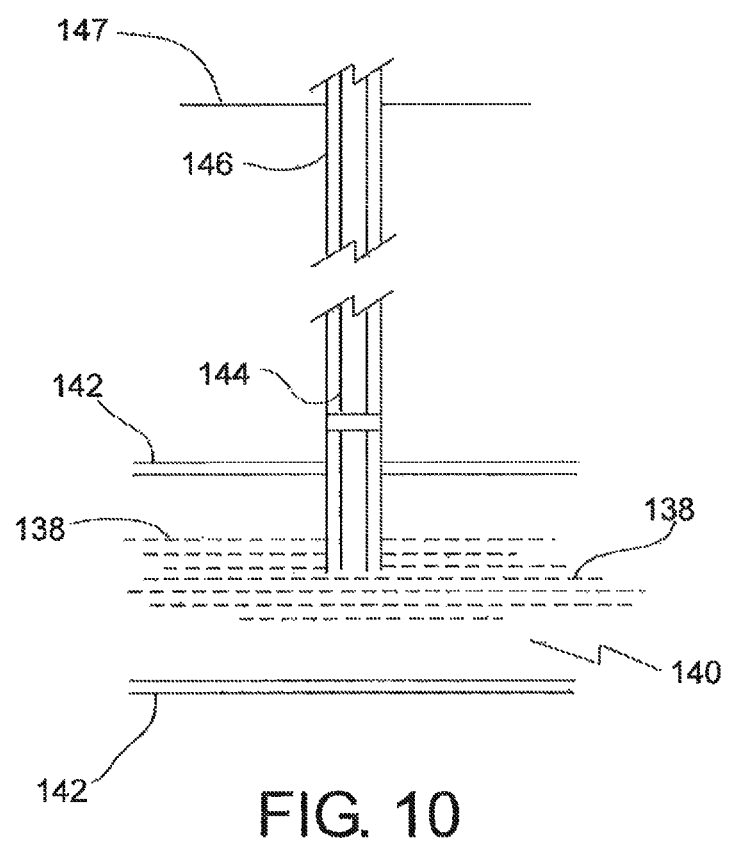
FIG. 10 shows an earth formation that has been fractured.

Referring to FIG. 10, the fracturing method disclosed generates artificial fractures 138 radiating out from a well bore 146 penetrating an earth formation 140 delimited by lines 142 below an earth surface 147. The fractures 138 make the formation 140 porous and permeable. The fractures extend through the earth formation away from the tubing 144 through which the frac fluid is introduced. Less than 10%, or even less than 5% or 1% residue by weight of the amount of hydrocarbon frac fluid that is applied to the well and formation remains in the earth formation. In other words, almost all the frac fluid can be recovered. The LPG has approximately half the hydrostatic head of water, thus the formation pressure will likely considerably exceed the LPG frac fluid head, and thus assist in flow back. The LPG also creates a single phase on flow back by mixing with the reservoir gas. This process may therefore eliminate $CO_2$ as gas assist on flow back. Because the vaporized LPG has essentially no viscosity, the gelled hydrocarbon does not remain in the well.

In case of a well sand off, the well 14 is shut, the flare stack is opened, and all sanded off components are blown out with nitrogen.

The apparatus of FIG. 1, 3 or 8 may be operated without additional of proppant, or without addition of gallant, but at the cost of reduced efficacy in the frac treatment.

Immaterial modifications may be made to the embodiments described here without departing from what is claimed.

What is claimed is:

1. A method for fracturing a formation penetrated by a well, the method comprising the steps of:
   prior to commencing a frac, purging system components with an inert gas and pressure testing all system components that are to be supplied with frac fluid;
   supplying a stream of frac fluid comprising propane, butane, or a mixture of propane and butane, from a frac fluid source into a well;
   pressurizing frac fluid in the well to create fractures in the formation;
   purging system components with inert gas while the well is closed; and
   releasing pressure from the well to allow frac fluid to vaporize and return to surface.

2. The method of claim 1 in which the system components comprise a proppant supply source, the method further comprising:
   supplying proppant from the proppant supply source into the stream of frac fluid from the frac fluid source;
   adding gellant to the stream of frac fluid; and
   pumping the proppant-containing frac fluid stream into the well with a frac pressure pump.

3. The method of claim 2 further comprising supplying a controlled amount of inert gas to the proppant supply source.

4. The method of claim 2 in which the proppant supply source comprises a pressure vessel.

5. The method of claim 4 in which proppant is metered into the frac fluid stream from the frac fluid source by an auger in cooperation with a valve.

6. The method of claim 2 in which the proppant supply source comprises a centrifugal pump.

7. The method of claim 2 in which the gellant has hydrocarbon chains commensurate in length with hydrocarbon chains of the frac fluid.

8. The method of claim 2 further comprising a liquid source connected to supply liquid into the proppant supply source for mixing with proppant prior to introduction of proppant into the stream of frac fluid.

9. The method of claim 8 in which the liquid source comprises a source of liquid hydrocarbons.

10. The method of claim 8 in which the proppant supply source comprises a pump for pumping liquid mixed with proppant into the stream of frac fluid.

11. The method of claim 8 in which the liquid source comprises a source of one or more of pentane, hexane, and heptane.

12. The method of claim 1 in which the frac fluid source comprises an insulated tank.

13. The method of claim 1 in which the frac fluid comprises nitrogen.

14. The method of claim 13 applied to fracturing a coal formation that contains gas.

15. The method of claim 13 applied to fracturing a shale formation that contains gas.

16. The method of claim 1 applied to fracturing a coal formation that contains gas.

17. The method of claim 1 applied to fracturing a shale formation that contains gas.

18. The method of claim 1 in which the frac fluid comprises propane, butane, or a mixture of propane and butane, in an amount of at least 80% by volume of the frac fluid.

19. The method of claim 1 in which the frac fluid comprises propane, butane, or a mixture of propane and butane, in an amount of at least 90% by volume of the frac fluid.

20. The method of claim 1 in which the frac fluid comprises propane, butane, or a mixture of propane and butane, in an amount of at least 95% by volume of the frac fluid.

21. The method of claim 1 in which frac fluids returned to surface are supplied to a sales line.

22. The method of claim 1 further comprising supplying pentane into the frac fluid.

23. The method of claim 22 which the stream of frac fluid comprises butane.

24. The method of claim 22 in which pentane is supplied into the stream of frac fluid.

25. The method of claim 1 further comprising supplying an inert gas into the stream of frac fluid and into the well along with the frac fluid.

26. The method of claim 25 in which the inert gas is supplied into the stream of frac fluid after the frac pressure pump.

27. The method of claim 25 applied to fracturing a coal formation that contains gas or a shale formation that contains gas.

28. The method of claim 25 in which the inert gas supplied into the well comprises nitrogen.

29. A method for fracturing a formation penetrated by a well, the method comprising the steps of:
   prior to commencing a frac, using an inert gas to both purge and pressure test all surface system components that are to be supplied with frac fluid;
   supplying a stream of frac fluid comprising propane, butane, or a mixture of propane and butane, from a frac fluid source into a well;
   pressurizing frac fluid in the well to create fractures in the formation;
   purging propane and butane from all surface system components that were supplied with frac fluid by using inert gas for the purging; and
   releasing pressure from the well to allow frac fluid to vaporize and return to surface.

30. The method of claim 29 in which the surface system components comprise a proppant supply source, the method further comprising:
   supplying proppant from the proppant supply source into the stream of frac fluid from the frac fluid source;
   adding gellant to the stream of frac fluid;
   pumping the proppant-containing frac fluid stream into the well with a frac pressure pump; and
   supplying a controlled amount of inert gas to the proppant supply source.

31. The method of claim 29 further comprising supplying pentane into the frac fluid.

32. The method of claim 30 further comprising a liquid source connected to supply liquid into the proppant supply source for mixing with proppant prior to introduction of proppant into the stream of frac fluid.

33. The method of claim 29 further comprising supplying an inert gas into the stream of frac fluid and into the well along with the frac fluid.

* * * * *